(12) United States Patent  
Care et al.

(10) Patent No.: US 6,729,140 B2  
(45) Date of Patent: May 4, 2004

(54) ELECTRICAL MACHINE

(75) Inventors: Ian C D Care, Derby (GB); Arnold C Newton, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/058,273

(22) Filed: Jan. 30, 2002

(65) Prior Publication Data

US 2002/0122723 A1 Sep. 5, 2002

(30) Foreign Application Priority Data

Feb. 9, 2001 (GB) .............................. 0103216

(51) Int. Cl.$^7$ ................................. F02C 6/00
(52) U.S. Cl. ........................... 60/802; 290/52
(58) Field of Search ............ 60/801, 802; 290/52

(56) References Cited

U.S. PATENT DOCUMENTS

| | | | | |
|---|---|---|---|---|
| 2,853,638 A | * | 9/1958 | Bonnano et al. | 290/52 |
| 4,309,621 A | * | 1/1982 | Litz | 290/52 |
| 4,367,413 A | * | 1/1983 | Nair | 290/52 |
| 5,376,827 A | | 12/1994 | Hines | |

FOREIGN PATENT DOCUMENTS

| | | |
|---|---|---|
| GB | 1147730 P | 4/1969 |
| GB | 117969 P | 12/1969 |
| GB | 1340363 P | 12/1973 |
| WO | WO 29721 A | 5/2000 |

* cited by examiner

Primary Examiner—Louis J. Casaregola  
(74) Attorney, Agent, or Firm—W. Warren Taltavull; Manelli, Denison & Selter PLLC

(57) ABSTRACT

An electrical machine, such as a generator or motor, is incorporated in a gas turbine engine. The engine has compressor blades which are shrouded at. Beyond the shroud, an electrical machine is provided by rotor projections which run in a channel in flux cores, with which excitor coils are associated. The result is an electrical machine which is external to the combustion gas paths of the engine, for ready access, and can have optimized magnetic flux paths for efficiency. High relative speeds within the electrical machine provide further advantages.

15 Claims, 3 Drawing Sheets

ELECTRICAL MACHINE

FIELD OF THE INVENTION

The present invention relates to electrical machines and in particular, to electrical machines for use in conjunction with gas turbine engines.

BACKGROUND OF THE INVENTION

Gas turbine engines, such as aero engines, are required to generate electrical energy for various purposes within and external to the engine, such as to provide power for control systems or to provide electrical power to an airframe. It has been proposed to provide a mechanical link from a rotating component of the engine, to a generator, in order to generate this electrical power. In an attempt to reduce mechanical complexity, it has been further proposed to incorporate an electrical generator within the rotating spools of the engine, preferably the high pressure spool. However, space limitations in the region of the central axis of the engine have been found to be such that this proposal is not wholly satisfactory.

It will be apparent that a device used for electrical generation while the engine is running can be used in reverse to provide drive, such as for starting the engine, and for this reason, the term "electrical machine" will be used herein to encompass a device used either as an electrical generator or as an electrical motor.

SUMMARY OF THE INVENTION

The present invention provides a gas turbine engine comprising at least one ring of rotating blades, and comprising an electrical machine which has a rotating part and a fixed part, wherein the rotating part is provided by the rotating blade ring.

Preferably, the rotating part is provided by an extremity of the blades. The extremity may be located beyond those parts of the blades which provide the aerodynamic function of the blades. The rotating part may be provided at the radially outward extremity of the blades. The blades are preferably shrouded, the shrouding separating those parts of the blades which provide the aerodynamic function of the blades, from those parts which provide the rotating part. The blades may be shrouded at the radially outer end of those parts which provide the aerodynamic function, and in that the electrical machine is provided substantially wholly outside the shrouded region.

The blades may be unshrouded. The blades may be unshrouded and have parts which provide the aerodynamic function of the blades, the aerodynamic parts further providing a part of the electrical machine.

The fixed part of the machine preferably comprises coils. The rotating part of the machine may comprise magnetically permeable material and/or permanently magnetised material. The parts of the machine preferably operate to form a permanent magnet machine, a transverse flux machine or a switched reluctance machine.

The blades preferably form a compressor or turbine of the engine. The engine may be a multi-shaft engine. The machine may be operable as a generator to draw energy from the engine, and/or a motor to drive the engine, whereby the machine may be used to transfer energy to or from the engine.

The fixed part of the machine may provide at least part of the containment system for the blades.

BRIEF DESCRIPTION OF THE DRAWINGS

Embodiments of the present invention will now be described in more detail, by way of example only, and with reference to the accompanying drawings, in which.

DETAILED DESCRIPTION OF THE INVENTION

Figure 1:
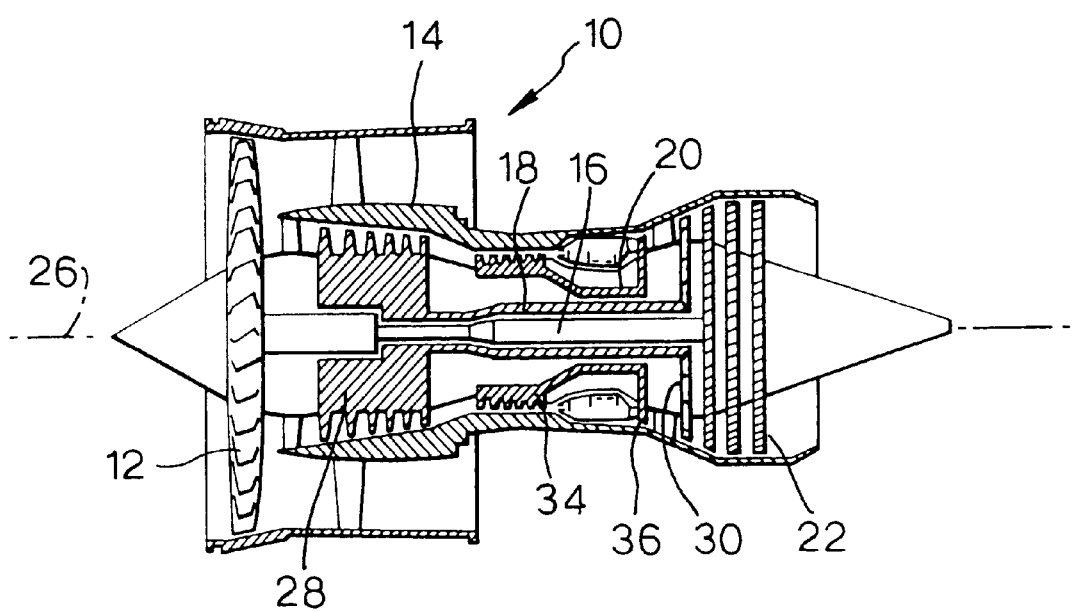
FIG. 1 is a simplified section through a conventional gas turbine engine.

Turning to the drawings, FIG. 1 shows a conventional gas turbine engine 10. The engine 10 comprises a front fan assembly 12 and a core engine 14. The engine is of the ducted fan by-pass type and has three relatively rotatable shafts including a low pressure shaft 16, an intermediate pressure shaft 18 and a high pressure shaft 20. The low pressure shaft 16 is a load transmitting shaft interconnecting the fan 12, and a turbine assembly 22 located at the downstream end of the core engine 14. The shaft 16 is rotatable about the axis 26 of the engine. The intermediate pressure shaft 18 is a hollow load transmitting shaft concentrically disposed around the shaft 16 and interconnecting a compressor 28 and a turbine rotor assembly 30. The high pressure shaft 20 is similarly a hollow load transmitting shaft concentric with the shafts 16 and 18, interconnecting a compressor 34 and a turbine rotor assembly 36. In this example, the compressors 28, 34 are of the multi-stage axial flow type, but could alternatively be of the transverse flow type.

Figure 2:
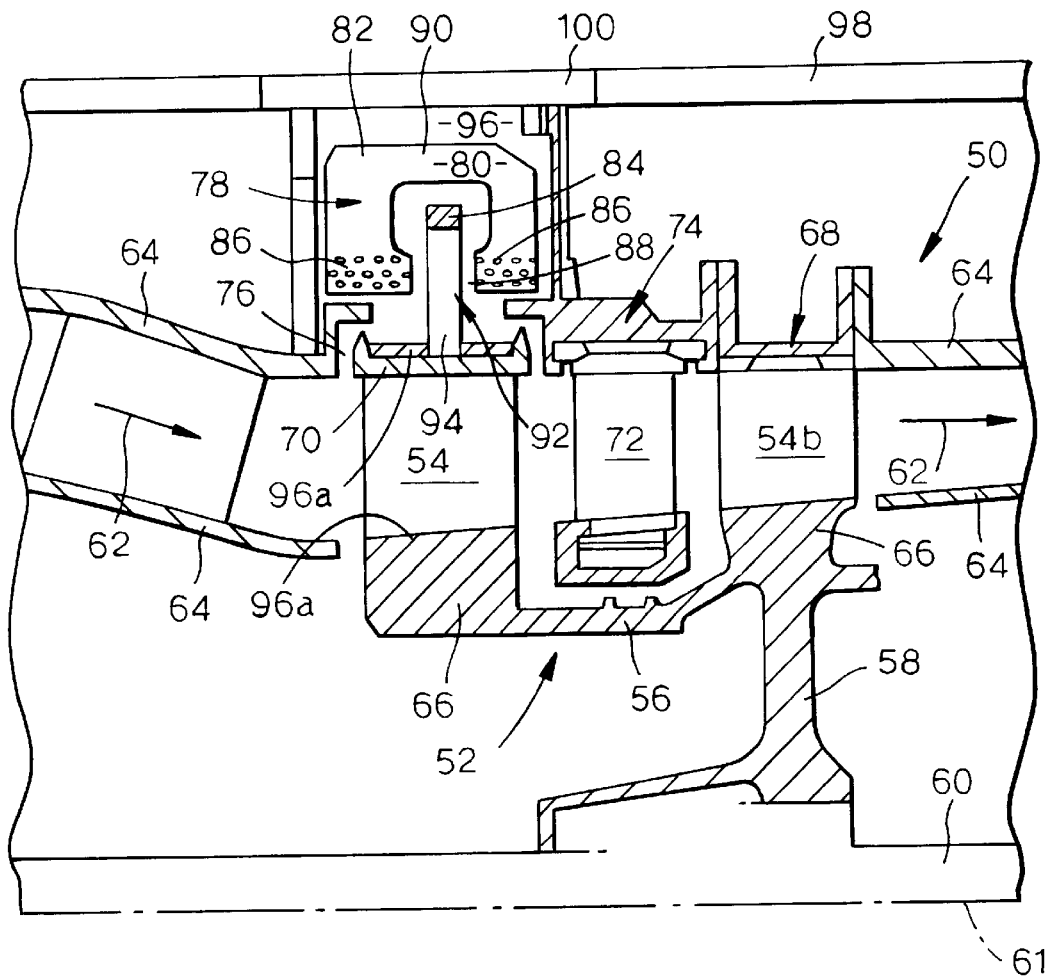
FIG. 2 is a highly simplified and schematic diagram of part of a gas turbine engine incorporating the present invention, shown at a plane; extending from, and including, the central axis of the engine.

Turning to FIG. 2, there is shown a short axial length of a gas turbine engine 50 which embodies the present invention, viewed transverse to the axis, at a plane which includes the axis and extends radially therefrom. The engine 50 has been greatly simplified for reasons of clarity, primarily by removal of components other than those described, but which may be broadly as set out above in relation to FIG. 1.

FIG. 2 illustrates the engine 50 in the region of the high pressure (HP) compressor 52. Alternatively, similar features could be incorporated in conjunction with other compressors, or with the turbines of the engine. The compressor 52 is a multi-stage compressor having two rings of compressor blades 54a, 54b connected together at 56. In this example, the blades 54b are mounted at 58 to the HP shaft or spool 60, which is in turn connected to the HP turbine (not shown), so that the HP turbine can drive the HP blades 54a, 54b, when the engine is in operation, by turning about the engine axis 61.

A path 62 for combustion gas is defined upstream of the blades 54a and downstream of the blades 54b by duct walls 64.

At the root of the blades 54a, 54b (i.e. at their radially inner end) the blades 54 are carried by discs 66, there being conventional means, such as shrouding, provided at the interface of the blades 54 and discs 66 to maintain adequate definition of the gas path 62 and prevent leakage. The blades 54 may be individual components mounted in conventional manner on the discs 66, or alternatively, the blades 54 and discs 66 may be of unitary construction.

At the radially outer end of the blades 54, shroud arrangements are provided for defining the outer perimeter of the gas path 62. Shroud arrangements 68 for the blades 54b may be entirely conventional in construction and are therefore not described further herein. The shroud arrangements at 70, at the radially outer end of the blades 54a, will be described in more detail below.

Guide vanes 72 are provided between the blades 54a, 54b and mounted at their radially outer end, at 74, to the outer casing of the engine 50. The guide vanes 72 may be fixed or of variable angles and/or shape. The guide vanes 72 are provided with conventional duct-defining arrangements and seal arrangements at their roots and tips, in order to provide adequate definition of the gas path 62 between the blades 54a and the blades 54b.

It will be apparent from the above description that to the extent so far described, the engine 50 is largely conventional, with the nature and construction of many features not specifically described being readily apparent to the skilled man. However, additional features are provided in accordance with the invention and in association with the blades 54a, as will now be described.

The shroud 70 of the blades 54a forms a substantially continuous ring around the outer periphery of the gas path 62, for containment of gases, and runs in a circumferential channel 76, there being conventional seal arrangements provided between the shroud 70 and the walls of the channel 76, such as positive pressure arrangements, convoluted paths or the like, to resist gas leakage round the shroud 70, into the channel 76.

In the event that the blades 54a are individual components, the shroud 70 will be made of components carried by the blades, which meet components carried by neighbouring blades to form the shroud. Alternatively, the blades and shroud could be of unitary construction.

Outside the shroud 70 (that is radially outwardly of the shroud 70), an electrical machine, indicated generally as 78, is formed in the following manner. First, the electrical machine 78 has a stator assembly 80 which includes a ring of magnetically conductive material 82 extending around the entire circumference of the blade ring 54a and having an inwardly facing channel 84. Alternatively, the ring 82 could be replaced with a set of horseshoe-shaped cores distributed around the circumference of the blade ring 54a, there being circumferential gaps between neighbouring cores.

The stator assembly 80 further comprises coils 86 with appropriate electrical connections (not shown) allowing the coils 86 to be excited to create magnetic flux directed generally axially across the gap formed by the mouth 88 of the channel 84.

One or more coils 86 could be provided for each horseshoe core, or coils 86 could be distributed around a continuous stator ring, or other magnetic arrangements could be used.

A web 90 of the stator assembly, or of each horseshoe core, forms a roof of the channel 84, and assists in providing a good magnetic flux path between coils 86 and between the opposed faces at the mouth 88.

The electrical machine 78 also has a rotor assembly 92 carried by the blade ring 54a, to turn with it. The rotor assembly 92 is thus provided by the blades, but outside the gas path 62. The rotor assembly 92 has a plurality of fingers 94 (only one of which is shown in FIG. 2) or an annular flange, which extend generally radially outwardly from the shroud 70, into the channel 84, through the mouth 88. Thus, as the HP compressor 52 turns, each finger 94 sweeps along the whole length of the channel 84, or passes in turn through each horseshoe core, and past each coil 86 in turn.

In this example, the fingers 94 are permanently magnetised in the direction parallel with the axis of the engine 50. The electrical machine 78 is therefore in the form of a permanent magnet (PM) machine.

It can be readily understood from the above description that by movement of the fingers 94 relative to the coils 86, as has been described, an electrical machine 78 is capable of use either as a generator or as a motor. Thus, when the engine 50 is in operation, the coils 80 can be tapped to draw power from the engine 50 in the form of electrical power.

In order to operate the electrical machine 78 as a motor, excitation currents are applied to the coils 86 in a sequential manner which causes the fingers 94 to seek to follow the magnetic fields around the circumference, thereby causing the rotor assembly 92, and hence the blades 54a, to turn. The principles of excitation of an induction motor in this manner, and techniques for creating and controlling excitation currents appropriately, are all within the knowledge of the skilled perser. The performance of the machine 78 will be influenced by design factors such as the number and spacing of the coils 86 and fingers 94.

Figure 3:
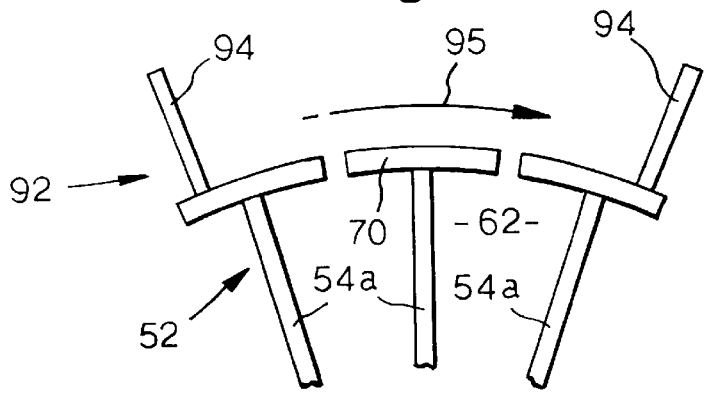
FIG. 3 is a schematic view of part of the face of the blade ring of the engine of FIG. 2.

Turning now to FIG. 3, part of the blade ring 54a can be seen when viewed along the axis 61 of the engine 50. These will turn in the direction 95 about the axis 61. Three blades 54a are visible in FIG. 3, each carrying a part of the shroud 70. Two blades also carry fingers 94, but the third, middle blade does not do so. This arises because, as can be seen from FIG. 3, the separation in arc of the fingers 94 differs from the separation in arc of the blades 54a. It is not necessary for the separation in arc to be the same, because the fingers 94 should be positioned to achieve the desired performance of the electrical machine 78, whereas aerodynamic parts of the blades 54a should be positioned to achieve the desired performance of the engine 50. In many situations, these two choices may result in different spacings in arc, as shown in FIG. 3. It is important to understand that in accordance with the invention, the spacing of the fingers 94 can be optimized largely independently of the optimisation of the spacing of the blades 54a because the shroud 70 forms, in effect, a boundary between a radially inner region containing aerodynamic parts of the blades 54a, and an extremity which is radially further out, beyond the shroud 70, and contains the electrical machine 78.

However, it will also be apparent that the complexity of component manufacture can be reduced by providing fingers 94 for each blade 54a, so that a blade ring can be formed from a series of identical components placed side-by-side. Alternatively, blades carrying fingers could alternate with blades which do not, or each blade could carry two fingers, for instance. While these simpler arrangements may prove to be the preferred options in practice, it is important to realise that the invention is not limited to implementation in this manner. The shapes of the fingers is shown as a simple rectangle, but many other shapes could be used, if appropriate to the performance of the machine.

It will be apparent that the fingers 94 represent features additional to those present on a conventional compressor blade ring. Accordingly, the mass of the blade ring 54a is likely to be greater than the mass of a conventional ring. Centrifugal force may therefore be greater than in a conventional arrangement. Additional and unconventional forces are also created on the blade ring by the operation of the electrical machine. It is thus envisaged that additional reinforcement for the blade containment may be required or necessary, such as in the regions indicated at 96, 96a. This may be in the form of steel cable or hawser, for instance, wound in the region 96, and may be reinforced, such as by carbon fibre or other material.

Further, it may be possible to rely on the components of the fixed part of the machine 78 to provide the, or some of the containment of the blades, perhaps by incorporating additional reinforcement into the machine 78.

Returning to FIG. 2, the casing 98 of the engine 50 is preferably provided with a removable access panel 100 through which the electrical machine 78 can be accessed for inspection or repair without interfering with the core of the engine 50. This ability to service the electrical machine 78 without disturbing the core engine 50 represents a significant advantage of the present invention.

It is envisaged that the independence of design of the electrical machine 78, achieved as described above, will allow magnetic flux paths to be optimized to give the electrical machine 78 good efficiency, thus helping to reduce the required bulk of the machine 78. Furthermore, the high relative speeds of the rotor and stator of the machine 78, and the high torque capability achieved, both by virtue of the location of the machine 78 at the outer radius of the blade disc, are both expected to provide advantages over arrangements in which electrical machines are coupled to the central shafts of the engine. However, the electrical machine 78 could be implemented at the radially inner extremity of the blades, preferably beyond the aerodynamic parts of the blades, and shielded by shrouding.

Figure 4:
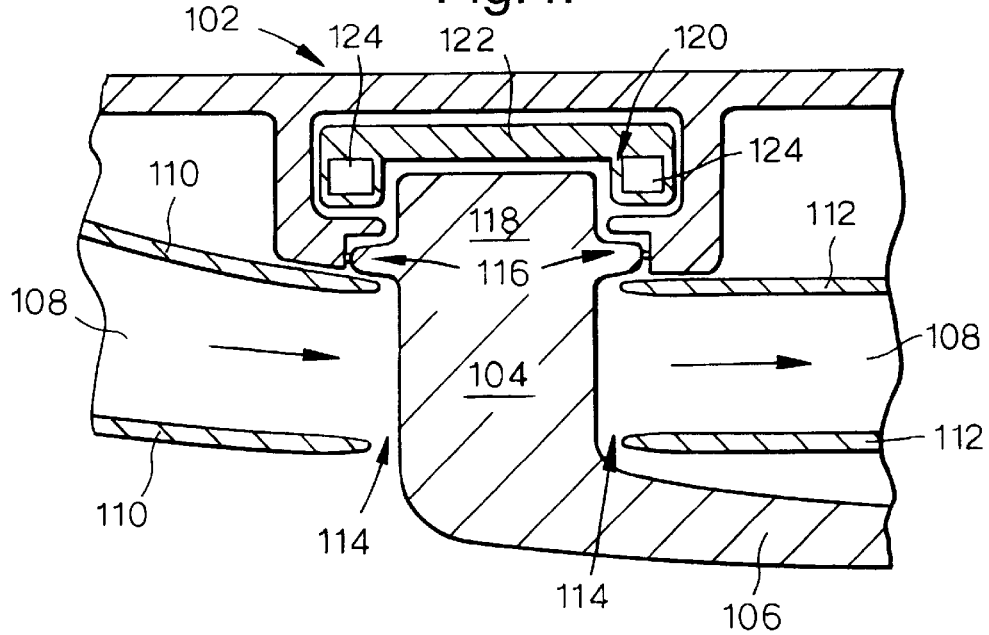
FIG. 4 is a view similar to that of FIG. 2, showing an alternative arrangement for the electrical machine.

FIG. 4 illustrates an alternative embodiment of the present invention. FIG. 4 is a view from a position equivalent to the viewing position of FIG. 2. The engine 102 illustrated in FIG. 4 has a ring of blades 104, only one of which is visible in FIG. 4. The blade 104 may form part of a compressor or turbine and is mounted at 106 to an appropriate shaft (not shown).

An annular combustion gas path 108 is defined upstream of the blades 104 by duct walls 110, and downstream of the blades 104 by duct walls 112. The blades 104 extend out through the duct walls 110, 112, which co-operate with the blades 104 to form shrouds at 114, and labyrinth seals at 116, both of which are of generally conventional form.

The radially outer extremity 118 of the blades 104 form rotor parts of an electrical machine at 120, which also has a stator 122. The stator 122 may be generally similar to the arrangement of FIG. 2, in which case the stator 122 will be provided with excitation coils at 124, and the extremity 118 will be permanently magnetised in a direction generally between the coils, so that a permanent magnet machine is formed by the stator 122, extremity 118 and coils 124. This machine can be used in the same manner as described above in relation to FIG. 2.

Figure 5:
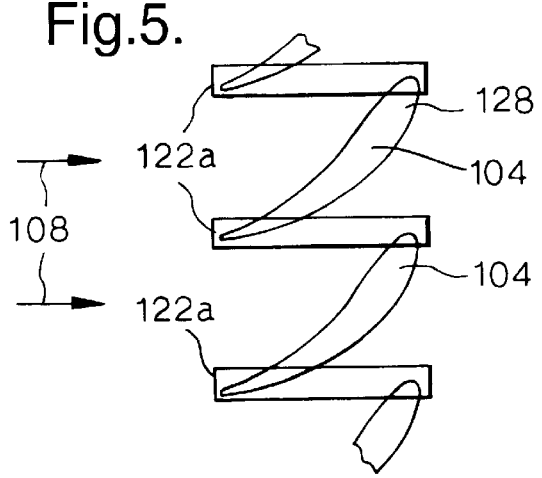
FIG. 5 is a schematic view of the engine of FIG. 4, along a radius of the engine.

FIG. 5 illustrates, in simple schematic manner, how a transverse flux machine can be constructed by modifying the magnetic arrangements of the device described above in relation to FIG. 4.

FIG. 5 is a schematic view from outside the engine 102, looking in a transverse direction toward the central axis of the engine. The stator 122a is in the form of a series of horseshoes arrayed around the blades 104. The blades 104 are viewed along their length, in FIG. 5 and, as is conventional, have an aerodynamic cross-section which is arranged at an angle to the direction of flow of gas along the gas path 108. It therefore becomes possible, as indicated in FIG. 5, for the stator horseshoes 122a to be spaced so that the leading edge 128 of a blade 104 will come into proximity with one stator horseshoe 122a, at the same time as the trailing edge of the same blade 104 is in close proximity with a neighbouring stator horseshoe 122a. This geometry enables a substantially continuous flux path to be provided around the circumference of the engine 102, by forming the extremities of the blades 104 of magnetically permeable material (but not permanently magnetised). The flux path then created would have a zig-zag form around the engine, passing across one blade from the leading edge to the trailing edge, then through the stator horseshoe 122a at the trailing edge and thus to the leading edge of the neighbouring blade 104. The result is a transverse flux (TF) electrical machine which can be operated in conjunction with excitation coils magnetically coupled with the stator horseshoes 122a, in a manner which will be readily understood by the skilled man.

Figure 6:
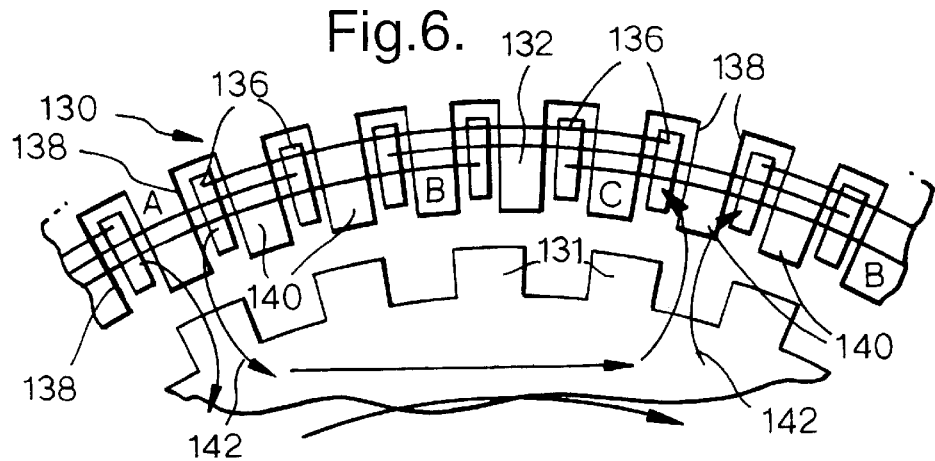
FIG. 6 is a highly schematic diagram of an alternative magnetic arrangement, viewed along the engine axis.

FIG. 6 illustrates schematically a further possibility, as follows. FIG. 6 is highly schematic and represents only the components of the electrical machine 130. In particular, this incorporates the radially outer extremities 131 of the blades, and a stator ring 132 which extends circumferentially around the engine, outside the blade extremities 131. The manner in which these components can be incorporated around a blade ring which contributes to engine operation in an otherwise conventional manner will be apparent to the skilled reader from the descriptions above, particularly in relation to FIGS. 2 and 4, and thus need not be described again in detail at this point.

The machine 130 illustrated in FIG. 6 is configured as a switched reluctance electrical machine. To this end, various excitation coils 136 are provided within slots 138 within the stator ring 132. The coils 136 are arranged into three phases (A, B, C) for excitation purposes and each coil 136 extends from a slot 138 of the corresponding phase, past slots of the other two phases, to a further slot of the same corresponding phase in order to complete its loop. This is illustrated schematically in FIG. 6 by lines extending between the slots, to represent coil windings. Thus, two coils 136 of a particular phase extend in opposite directions to the nearest slot of the next pair of slots of the same phase. This completes the magnetic arrangements of the stator and results in poles 140 between slots 138, the poles 140 being positioned in sequence for the three phases, repeatedly around the stator ring 132.

The blade extremities 131 are made of magnetically permeable material and can therefore provide a flux path from a pole 140, when aligned with the pole 140. Flux 142 is illustrated crossing from a pole 140 to a blade extremity 131 at two position in FIG. 6, where the appropriate alignment is present with poles of the same phase.

The blade ring is designed to provide a magnetic path between blade extremities 131 which have the appropriate alignment, in order to allow complete flux paths to be created. However, by arranging for the spacing of blade extremities 131 to be different to the spacing of poles 140, and by appropriately timing the excitation of the coils 136 in relation to the speed of rotation of the blade extremities 131, a situation can be reached at which other, non-aligned extremities 131 are constantly seeking to align themselves with poles 140, thus creating movement of the blade ring.

This manner of operation is in the form of a switched reluctance motor but can alternatively be used in reverse, as a switched reluctance generator, allowing energy in the blade ring to be tapped electrically from the coils 136.

It will thus be apparent that in all of these examples, the electrical machine can be used to extract energy from the engine, or to provide energy to the engine for starting or load distribution reasons.

The electrical machine has been described outside the ring of blades, which is expected to provide good torque and speed characteristics, but could be located elsewhere, such as in the region of the shaft. In a further alternative, the blades or a blade disc could be magnetically permeable to provide the rotating component, there being coils located inside the blades, such as on a bearing housing.

Many variations and modifications can be made to the apparatus described above, without departing from the scope of the present invention. In particular, shapes, forms, sizes and relative sizes of the various components can be modified, as will be apparent to the person skilled in the art. The arrangements are envisaged as being applied to the high pressure compressor of a multi-spool engine, such as a three spool engine, but could readily be adapted to other compressors or engines having a different number of spools. The embodiments have been described with reference to blades and blade rings, but could use blade discs or blisks.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A gas turbine engine comprising an electrical machine, wherein the electrical machine comprises a rotating part and a fixed part, the rotating part is provided by the rotating blade ring, the rotating blade ring comprises a plurality of blades, each blade having an extremity of magnetically permeable material, a leading edge and a trailing edge, the fixed part comprises a casing having an array of circumferentially spaced stators thereabout, each stator comprising excitation coils having a first end and a second end; wherein in a first position the leading edge of one blade is radially aligned with a first end of a first stator and the trailing edge of another blade is radially aligned with the second end of the first stator thereby providing a substantially continuous magnetic flux path capable of generating an electrical output.

2. An engine comprising as claimed in claim 1 wherein the coils are arranged into three phases for excitation.

3. An engine according to claim 1, wherein the extremity is located beyond those parts of the blades which provide the aerodynamic function of the blades.

4. An engine according to claim 1, wherein the rotating part is provided at the radially outward extremity of the blades.

5. An engine according to claim 1, wherein the blades are shrouded, the shrouding separating those parts of the blades which provide the aerodynamic function, from those parts which provide the rotating part of the electrical machine.

6. An engine according to claim 5, wherein the blades are shrouded at the radially outer end of those parts which provide the aerodynamic function, and in that the electrical machine is provided substantially wholly outside the shrouded region.

7. An engine according to claim 1 wherein the blades are unshrouded.

8. An engine according to claim 1, wherein the blades are unshrouded and have parts which provide the aerodynamic function of the blades, the aerodynamic parts further providing a part of the electrical machine.

9. An engine according to claim 1 wherein the fixed part of the machine comprise coils.

10. An engine according to claim 1 wherein the rotating part of the machine comprises any one of a group comprising magnetically permeable material or permanently magnetized material.

11. An engine according to claim 1 wherein the parts of the machine operate to form any one of a group comprising a permanent magnet machine, a transverse flux machine or a switched reluctance machine.

12. An engine according to claim 1 wherein the blades form any one of a group comprising a compressor or turbine of the engine.

13. An engine according to claim 1 wherein the engine is a multi-shaft engine.

14. An engine according to claim 1 wherein the fixed part of the machine provides at least part of the containment system for the blades.

15. A gas turbine engine comprising an electrical machine, wherein the electrical machine comprises a rotating part and a fixed part, the rotating part is provided by the rotating blade ring, the rotating blade ring comprises a plurality of blades, each blade having an extremity of magnetically permeable material, a leading edge and a trailing edge, the fixed part comprises a casing having an array of circumferentially spaced stators thereabout, each stator comprising excitation coils having a first end and a second end; wherein in a first position the leading edge of one blade is radially out of alignment with a first end of a first stator and the trailing edge of another blade is radially out of alignment with the second end of the first stator thereby providing electrical energy to the coils and producing a substantially continuous magnetic flux path capable of aligning the leading edge of one blade and the trailing edge of another blade with the first and second ends of the excitation coils thereby rotating the rotor.

* * * * *